United States Patent
Zhao

(10) Patent No.: US 7,804,258 B2
(45) Date of Patent: Sep. 28, 2010

(54) CIRCUIT FOR PROVIDING AN APPROXIMATELY CONSTANT RESISTANCE AND/OR CURRENT AND METHOD THEREFOR

(76) Inventor: Bin Zhao, 14 Figaro, Irvine, CA (US) 92606

( * ) Notice: Subject to any disclaimer, the term of this patent is extended or adjusted under 35 U.S.C. 154(b) by 385 days.

(21) Appl. No.: 11/929,194

(22) Filed: Oct. 30, 2007

(65) Prior Publication Data

US 2009/0108776 A1   Apr. 30, 2009

(51) Int. Cl.
    *G05F 1/00* (2006.01)
(52) U.S. Cl. .................. 315/307; 315/308; 315/291; 315/185 R
(58) Field of Classification Search ............ 315/291, 315/299, 300, 301, 307, 308, 312, 313, 320, 315/185 R, 186, 189, 192, 193, 185 S, 209 R, 315/210, 224, 226, 209 T, 246, 287; 362/800
See application file for complete search history.

(56) References Cited

U.S. PATENT DOCUMENTS 6,864,641 B2   3/2005   Dygert
7,116,086 B2   10/2006  Burgyan et al.

*Primary Examiner*—Douglas W Owens
*Assistant Examiner*—Jianzi Chen
(74) *Attorney, Agent, or Firm*—Susan C. Hill

(57) ABSTRACT

A circuit can provide an approximately constant resistance value that is virtually independent of process and temperature variations. A current control circuit may use a device that tracks the changes in a corresponding device over process and temperature variations. As a result, the behavior of device may be used to help determine the control information provided to device in order to maintain an approximately constant resistance Rm over process and temperature variations. The approximately constant resistance Rm may be used to provide an approximately constant current $I_{LED}$. A wide variety of applications, not just LED drivers, may benefit from the use of an approximately constant resistance and/or current.

13 Claims, 1 Drawing Sheet

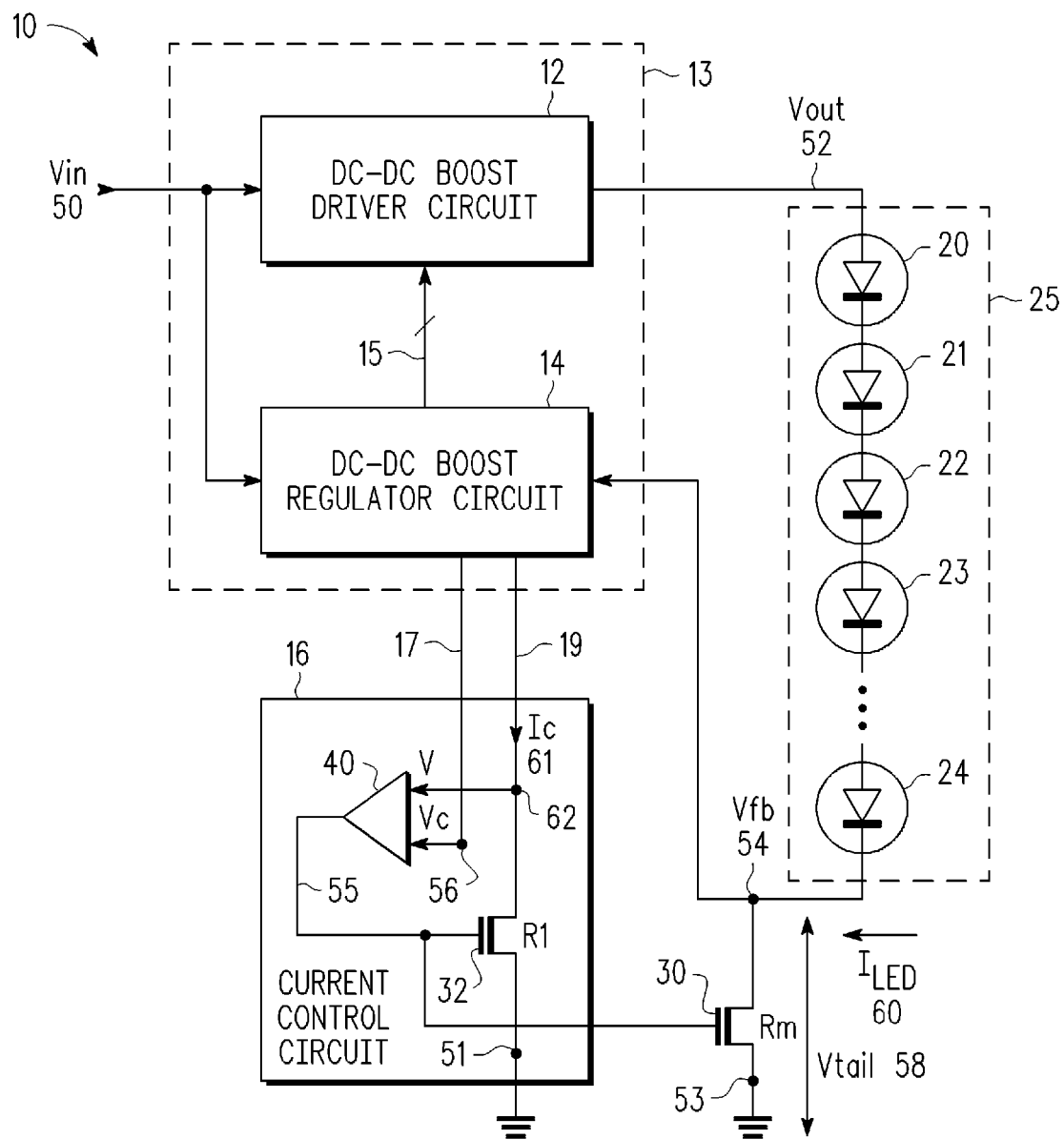
FIGURE

CIRCUIT FOR PROVIDING AN APPROXIMATELY CONSTANT RESISTANCE AND/OR CURRENT AND METHOD THEREFOR

BACKGROUND

1. Field

This disclosure relates generally to a circuit, and more specifically, to a circuit for providing an approximately constant resistance and/or current and method therefor.

2. Related Art

For some electrical circuits it is desirable to precisely control or regulate the current flowing through a portion of the circuit. As one example, the light intensity of light emitting diodes (LEDs) is dependent upon the current flowing through the LEDs. For many LED applications, it is desirable to maintain an approximately constant light intensity of the LEDs. This may be accomplished by maintaining an approximately constant current through the LEDs. Many other devices or circuits may also benefit from a circuit or techniques that precisely controls or regulates current flow.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The FIGURE illustrates, in partial block diagram and partial schematic diagram form, a circuit in accordance with one embodiment of the present invention.

DETAILED DESCRIPTION

One way to provide an approximately constant current through a portion of a circuit is to use the relationship between voltage (V), current (I), and resistance (R), namely V=IR. Assuming a constant or approximately constant voltage drop across a portion of a circuit, if the resistance is held constant or approximately constant, then the current through that portion of the circuit will be constant or approximately constant. The term "resistance" as used herein is to be understood to mean resistance or impedance.

To achieve a constant resistance, some prior art circuits use discrete resistors that are not integrated directly as part of the circuitry on an integrated circuit. One advantage of such discrete resistors is that they can easily meet the precision requirements. For example, the manufacturer of the discrete resistors can specify or guarantee that each discrete resistor having a nominal resistance value of "X" ohms will be within one percent or less of the nominal value "X" ohms. For many real world applications, plus or minus one percent is a sufficient level of precision. On the other hand, some disadvantages of such discrete resistors is that they can cost a significant amount and can require a significant amount of space compared to a resistor that is integrated directly on an integrated circuit.

To achieve a constant resistance, some prior art circuits use integrated resistors that are integrated directly as part of the circuitry on an integrated circuit. Some advantages of such integrated resistors are that they require less space and are relatively inexpensive. On the other hand, one disadvantage of such integrated resistors is that they have difficulty meeting the precision requirements. For example, the resistance value of an integrated or on-chip resistor can vary significantly due to temperature variations and due to variations in the fabrication process used to manufacture the integrated circuit. For example, the manufacturer of the integrated resistors may only be able to specify or guarantee that an integrated resistor having a nominal resistance value of "X" ohms will be within 20 percent or less of the nominal value "X" ohms. For some applications using an integrated circuit, this lack of precision may be a significant problem.

It was thus desirable to provide a small, cost effective circuit that could provide a constant or approximately constant resistance that was virtually independent of process and temperature variations. In addition, for some applications, such as, for example, some low voltage and/or low power applications, it may be desirable to provide a circuit that uses low resistance values. For some applications, lower resistance values produce less wasted power dissipation. However, alternate embodiments may use a higher resistance value if desired.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The FIGURE illustrates a circuit 10 which can provide an approximately constant resistance value "Rm" that is virtually independent of process and temperature variations. In addition, for some embodiments the resistance value Rm of transistor 30 can be small (e.g. by appropriately sizing transistor 30) in order to eliminate the drawbacks (e.g. increased power dissipation) due to a high IR drop across transistor 30. Alternate embodiments may use more, less, or different circuit elements in circuit 10 in order to provide an approximately constant resistance value that is virtually independent of process and temperature variations.

In the illustrated embodiment of circuit 10, a circuit 13 has a DC-DC boost driver circuit 12 that receives an input voltage Vin 50 and provides an output voltage Vout 52. Vin 50 is also provided as an input to a DC-DC boost regulator circuit 14. DC-DC boost regulator circuit 14 provides one or more conductors or signals 15 to DC-DC boost driver circuit 12. In the illustrated embodiment, DC-DC boost regulator circuit 14 provides a voltage V 62 and a current Ic 61 by way of conductor 19 to current control circuit 16. Similarly, DC-DC boost regulator circuit 14 provides a voltage Vc 56 by way of conductor 17 to current control circuit 16. Also, in the illustrated embodiment, DC-DC boost regulator circuit 14 receives a feedback voltage Vfb 54 as an input.

In the illustrated embodiment of circuit 10, current control circuit 16 has an amplifier 40 which receives a voltage V 62 at a first input and a voltage Vc 56 at a second input. Voltage Vc 56 represents the voltage at node 56 and V 62 represents the voltage at node 62. In the illustrated embodiment, amplifier 40 has an output 55 that is coupled to the control electrode or gate of n-channel MOSFETs (metal oxide semiconductor field effect transistors) 32 and 30. The resistance R1 is the resistance between node 62 and node 51, and the resistance Rm is the resistance between node 54 and node 53. Note that in the illustrated embodiment, nodes 51 and 53 are coupled to a power supply voltage that is approximately ground. Alternate embodiments may allow or use different voltage for nodes 51 and 53 other than approximately ground. In the illustrated embodiment of circuit 10, transistor 32 has a first current electrode that is coupled to node 62. Node 62 is also coupled to circuit 13 and to the first input of amplifier 40. The second current electrode of transistor 32 is coupled to node 51. Also in the illustrated embodiment of circuit 10, transistor 30 has a first current electrode that is coupled to node 54. Vfb 54 represents the voltage at node 54. Node 54 is also coupled to circuit 13. The second current electrode of transistor 30 is coupled to node 53. The voltage Vtail 58 represents the voltage differential between the two current electrodes of transistor 30, which in the illustrated circuit 10 is approximately equal to Vfb 54.

In one embodiment, circuit 10 has an LED circuit 25 comprising a plurality of LEDs 20-24 coupled in series between the output of DC-DC boost driver circuit 12 and node 54. Although the illustrated embodiment of circuit 10 shows five LEDs 20-24, alternate embodiments may use any number of LEDs, or alternately may use any desired elements to be driven in circuit 25. LEDs are just one possible example of circuit elements that may benefit from being driven using an approximately constant current. Alternate embodiments may use circuit elements other than LEDs or circuit elements in addition to LEDs. In the illustrated embodiment of circuit 10, $I_{LED}$ 60 is the current that is flowing through the LEDs 20-24.

The operation of circuit 10 will now be discussed. Current control circuit 16 and transistor 30 operate together to provide an approximately constant resistance Rm between nodes 54 and 53. The voltage on the control electrode of transistor 30 is regulated by current control circuit 16 so that an approximately constant resistance Rm is achieved over manufacturing process variations and over a wide operating temperature range.

In the illustrated embodiment, current control circuit 16 has a sense transistor 32 that has similar device characteristics or properties (e.g. threshold voltage, resistance and/or conductivity, channel length, etc.) as transistor 30. More specifically, in one embodiment, sense transistor 32 has device characteristics or properties that vary over process and temperature in the same or approximately the same manner as transistor 30. Thus the changes in the one or more selected device characteristics/properties of transistor 32 track the changes in the same device characteristics/properties of transistor 30 over relevant process and temperature variations. As a result, the behavior of transistor 32 may be used to help determine the gate voltage or control electrode voltage provided to transistor 30. The gate voltage or control electrode voltage provided to transistor 30 will affect the resistance Rm between the two current electrodes of transistor 30. In one embodiment, the layout of transistors 32 and 30 are done in an analog-matching-configuration. In alternate embodiments, it is sufficient to layout transistor 32 so that its device characteristics/properties track the changes in the same device characteristics/properties of transistor 30 over relevant process and temperature variations (e.g. temperatures at which an integrated circuit is expected to operate).

In one embodiment, current control circuit 16 uses an operational amplifier 40 to form a closed-loop control circuit to regulate the gate or control electrode voltage of transistor 30. As a result, the resistance value Rm of transistor 30 may be kept at an approximately constant value. In the illustrated embodiment, amplifier 40 compares two input voltages, namely V 62 and Vc 56, and provides an output signal having a magnitude that is a function of the voltage differential between V 62 and Vc 56. Alternate embodiments may use a different type of amplifier in current control circuit 16, or may alternately use circuitry other than an amplifier as part of a feedback control circuit.

In one embodiment of circuit 10, DC-DC boost regulator circuit 14 has an internal voltage Vreg. In one embodiment, Vreg is selected to be the specified, required, targeted, predetermined, or desired voltage for Vfb 54. In one embodiment, this voltage Vreg is provided to amplifier 40 as Vc 56. Transistor 32 is used to mimic or track the behavior of transistor 30 over temperature and process variations as (1) transistors 32 and 30 have the same or similar device characteristics; and (2) the same gate voltage at node 55 is used to control the resistance of both transistors 32 and 30. Note that the resistance of transistors 32 and 30 is determined by the voltage on their control or gate electrodes. The voltage on the gate or control electrode of transistor 32 determines how conductive it is, and thus how much resistance there is from one current electrode to the other. Similarly, the voltage on the gate or control electrode of transistor 30 determines how conductive it is, and thus how much resistance there is from one current electrode to the other.

Amplifier 40 senses the voltage V at node 62 as compared to the predetermined voltage Vc 56. By adjusting the voltage on conductor 55, amplifier 40 forces the voltage V at node 62 to be approximately equal to Vc 56. With the voltage V at node 62 kept approximately constant (i.e. equal to approximately Vc 56), and forcing an approximately constant current Ic 61 through transistor 32, the resistance of transistor 32 is kept approximately constant. Note that the characteristics of transistor 32 will vary over process and temperature in a similar manner to the characteristics of transistor 30. Current control circuit 16 can use the behavior of transistor 32 to adjust the voltage provided to the gate or control electrode of transistor 30 so that the current going through transistor 30 remains approximately constant regardless of process and temperature variations if the voltage Vfb 54 at node 54 can be kept approximately constant. The voltage Vfb 54 at node 54 is kept approximately constant (i.e. equal to approximately Vreg and Vc 56) by circuit 13 to adjust Vout 52 as needed. As a result, an approximately constant current $I_{LED}$ 60 may be kept flowing through LEDs 20-24 as desired.

Note that Vtail in the illustrated embodiment is the voltage between the LED tail or end and ground. A large Vtail results in higher power dissipation and lower power efficiency. In addition, a large Vtail for a circuit may lead to a lower number of LEDs 20-24 that can be used in series operation for that circuit. It is thus usually desirable to have a low Vtail for an LED driver circuit. Note that the voltage Vtail for the illustrated embodiment of circuit 10 is forced to a predetermined voltage Vreg that may be selected to be very low. For example, for one embodiment, Vreg (and thus Vtail) is selected to be approximately 200 milliVolts (mV) or less. For an alternate embodiment, Vreg (and thus Vtail) is selected to be approximately 150 mV or less. For yet another alternate embodiment, Vreg (and thus Vtail) is selected to be approximately 100 mV or less. As a result of the low Vtail for circuit 10, circuit 10 may use less power and may enable more LEDs (such as 20-24) to be used in series between Vout 52 and Vfb 54 than other LED driver circuits that use a higher Vtail. Note also that the size of transistor 30 is not required to be excessively large in order to produce a voltage Vtail that is sufficiently small.

In alternate embodiments, circuit 13 may be implemented in any desired manner. As one possible example, circuit 13 may use an inductor-based DC-DC boost converter or a charge-pump based DC-DC voltage up converter. In some embodiments, the circuitry used to implement circuit 13 and amplifier 40 may be known in the art.

By now it should be appreciated that there has been provided a circuit for maintaining an approximately constant resistance through a portion of the circuit. By maintaining an approximately constant resistance through the portion of the circuit, it is possible to maintain an approximately constant current through the same or a related portion of the circuit. Such a resistance regulating or current regulating circuit may have many applications. One such application is as a driver circuit for one or more LEDs. There are many more applications that can benefit from a low cost, low power circuit for regulating resistance and/or current.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed. For example, a circuit using p-channel transistors in place of n-channel transistors 32 and 30 may alternately be used. In addition, in alternate embodiments transistors 32 and 30 may be any type of appropriate integrated circuit device; transistors are just one possible device that may be used.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of circuit 10 are circuitry located on a single integrated circuit or within a same device. Alternatively, circuit 10 may include any number of separate integrated circuits or separate devices interconnected with each other. Circuit 10 or portions thereof may be soft or code representations of physical circuitry or of logical representations convertible into physical circuitry. As such, circuit 10 may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, current control circuit 16 may be implemented using different circuitry than that illustrated in the FIGURE. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text

1. A method comprising:
   providing a first device for example (30) which has a first characteristic that changes in a first predetermined manner in response to a change in at least one of temperature and process;
   providing a second device for example (32) which has the first characteristic that changes in the first predetermined manner in response to the change in at least one of temperature and process;
   providing a same control signal for example (55) to a control input of the first device and to a control input of the second device;
   using the same control signal to maintain an approximately constant first resistance for example (R1) through the second device; and
   using the same control signal to maintain an approximately constant second resistance for example (Rm) through the first device.

2. A method as in statement 1, wherein the first device and the second device are coupled in parallel.

3. A method as in statement 1, wherein the first device comprises a first transistor and wherein the second device comprises a second transistor.

4. A method as in statement 1, wherein the first device comprises a first n-channel transistor and wherein the second device comprises a second n-channel transistor.

5. A method as in statement 1, wherein the control signal is provided from an amplifier circuit for example (40).

6. A method as in statement 1, wherein the first device and the second device are integrated on a same integrated circuit.

7. A method as in statement 1, further comprising:
   maintaining an approximately constant first current through the first device.

8. A method as in statement 7, further comprising:
   maintaining an approximately constant second current through the second device.

9. A method as in statement 1, further comprising:
   providing a driver circuit for a plurality of light emitting diodes for example (LEDs) (20-24).

10. A method as in statement 1, wherein a voltage for example (Vtail 58) across the second resistance for example (Rm) is less than or equal to 100 milliVolts (mV).

11. A circuit, comprising:
   a first transistor for example (30) having a first characteristic that varies over at least one of temperature and process;
   a control circuit for example (16), comprising:
      a second transistor for example (32) in parallel with the first transistor, the second transistor having a second characteristic that varies over at least one of temperature and process,
      wherein the first characteristic and the second characteristic are a same characteristic that responds similarly to changes in at least one of temperature and process; and
      a comparison circuit for example (40) for comparing a first input for example (V 62) and a second input for example (Vc 56) and for providing an output for example (55) based on a difference between the first input and the second input,
         wherein the output of the comparison circuit is used to maintain a resistance for example (Rm) of the first transistor at an approximately constant first value, and
         wherein the output of the comparison circuit is used to maintain a resistance for example (R1) of the second transistor at an approximately constant second value.
12. A circuit as in statement 11, wherein the output of the comparison circuit is coupled to a control electrodes of the first transistor and to a control electrode of the second transistor.
13. A circuit as in statement 11, further comprising:
   a DC-DC boost circuit for example (13) which provides a predetermined voltage for example (Vc 56) to the second input of the comparison circuit.
14. A circuit as in statement 11, wherein the comparison circuit comprises an operational amplifier.
15. A circuit as in statement 11, further comprising:
   a plurality of LEDs for example (20-24) coupled in series with the first transistor.
16. A circuit, comprising:
   a light emitting diode (LED) circuit for example (25) comprising a plurality of LEDs for example (20-24);
   a DC-DC boost circuit for example (13) coupled to the LED circuit, the DC-Dc boost circuit providing a first voltage for example (Vout 52) and receiving a second voltage for example (Vfb 54);
   a first transistor for example (30) having a first current electrode coupled to the LED circuit and to the DC-DC boost circuit, the first transistor also having a second current electrode and having control electrode; and
   a control circuit for example (16), comprising:
      a second transistor for example (32) having a first current electrode coupled to the DC-DC boost circuit, having a second current electrode coupled to the second current electrode of the first transistor, and having a control electrode coupled to the control electrode of the first transistor; and
      an amplifier for example (40) having a first input for example (62) coupled to the first current electrode of the second transistor, having a second input for example (56) couple to the DC-DC boost circuit, and having an output for example (55) coupled to the control electrode of the first transistor and to the control electrode of the second transistor.
17. A circuit as in statement 16, wherein the output of the amplifier is used to maintain a resistance of the first transistor at an approximately constant first value for example (Rm).
18. A circuit as in statement 17, wherein the output of the amplifier is used to maintain a resistance of the second transistor at an approximately constant second value for example (R1).
19. A circuit as in statement 16, wherein a voltage differential between the first current electrode and the second current electrode for example (Vtail 58) of the first transistor is less than 200 milliVolts (mV).
20. A circuit as in statement 16, wherein the second current electrode of the first transistor and the second current electrode of the first transistor are coupled to a same power supply voltage.

What is claimed is:
1. A circuit, comprising:
   a light emitting diode (LED) circuit comprising a plurality of LEDs;
   a DC-DC boost circuit coupled to the LED circuit, the DC-DC boost circuit providing a first voltage and receiving a second voltage, wherein the plurality of LEDs are connected in-series between a first node for providing the first voltage and a second node, and wherein the plurality of LEDs are configured to conduct an LED circuit current;
   a first transistor having a first characteristic that varies over at least one of temperature and process, wherein the first transistor having a first current electrode coupled to the DC-DC boost circuit, the first transistor also having a second current electrode coupled to a ground terminal, and having a control electrode, wherein the first current electrode of the first transistor is coupled to the second node for receiving the LED circuit current, and wherein a feedback voltage, generated at the second node as a result of the LED circuit current and a first resistance of the first transistor between the second node and the ground terminal, is supplied as the second voltage to the DC-DC boost circuit;
   a control circuit, comprising:
      a second transistor in parallel with the first transistor, the second transistor having a second characteristic that varies over at least one of temperature and process,
      wherein the first characteristic and the second characteristic are a same characteristic that responds similarly to changes in at least one of temperature and process, and wherein the second transistor having a first current electrode coupled to the DC-DC boost circuit at a third node for receiving a constant current from the DC-DC boost circuit, the second transistor further having a second current electrode coupled to the ground terminal, wherein a voltage is generated at the third node as a result of the constant current and a second resistance of the second transistor between the third node and the ground terminal, and the second transistor having a control electrode coupled to the control electrode of the first transistor; and
      a comparison circuit for comparing a first input and a second input and for providing an output based on a difference between the first input and the second input,
      and wherein the comparison circuit having the first input coupled to the first current electrode of the second transistor to receive the voltage generated at the third node, the comparison circuit having the second input coupled to the DC-DC boost circuit for receiving a constant voltage from the DC-DC boost circuit, and the comparison circuit having the output coupled to the control electrode of the first transistor and to the control electrode of the second transistor for provid- ing a control voltage to the first transistor and the second transistor to vary the resistance of the first transistor and the resistance of the second transistor.

2. A circuit as in claim 1, wherein the comparison circuit comprises an operational amplifier.

3. A circuit as in claim 1, wherein the output of the comparison circuit is used to maintain the resistance of the first transistor at an approximately constant first value.

4. A circuit as in claim 1, wherein the output of the comparison circuit is used to maintain the resistance of the second transistor at an approximately constant second value.

5. A circuit as in claim 1, wherein a voltage differential between the first current electrode and the second current electrode of the first transistor is less than 200 milliVolts (mV).

6. A circuit as in claim 1, wherein the combination of the control circuit and the comparison circuit forms a closed-loop control circuit to regulate the control voltage.

7. A circuit as in claim 1, wherein the DC-DC boost circuit generates a regulated voltage, and wherein the regulated voltage is provided as the constant voltage.

8. A circuit, comprising:
a light emitting diode (LED) circuit comprising a plurality of LEDs;
a DC-DC boost circuit coupled to the LED circuit, the DC-DC boost circuit providing a first voltage and receiving a second voltage, wherein the plurality of LEDs are connected in-series between a first node for providing the first voltage and a second node, and wherein the plurality of LEDs are configured to conduct an LED circuit current;
a first transistor having a first current electrode coupled to the DC-DC boost circuit, the first transistor also having a second current electrode coupled to a ground terminal, and having a control electrode, wherein the first current electrode of the first transistor is coupled to the second node for receiving the LED circuit current, and wherein a feedback voltage, generated at the second node as a result of the LED circuit current and a first resistance of the first transistor between the second node and the ground terminal, is supplied as the second voltage to the DC-DC boost circuit; and
a control circuit, comprising:
a second transistor having a first current electrode coupled to the DC-DC boost circuit at a third node for receiving a constant current from the DC-DC boost circuit, the second transistor further having a second current electrode coupled to the ground terminal, wherein a voltage is generated at the third node as a result of the constant current and a second resistance of the second transistor between the third node and the ground terminal, and the second transistor having a control electrode coupled to the control electrode of the first transistor; and
an amplifier having a first input coupled to the first current electrode of the second transistor to receive the voltage generated at the third node, the amplifier having a second input coupled to the DC-DC boost circuit for receiving a constant voltage from the DC-DC boost circuit, and the amplifier having an output coupled to the control electrode of the first transistor and to the control electrode of the second transistor for providing a control voltage to the first transistor and the second transistor to vary the resistance of the first transistor and the resistance of the second transistor.

9. A circuit as in claim 8, wherein the output of the amplifier is used to maintain the resistance of the first transistor at an approximately constant first value.

10. A circuit as in claim 9, wherein the output of the amplifier is used to maintain the resistance of the second transistor at an approximately constant second value.

11. A circuit as in claim 8, wherein a voltage differential between the first current electrode and the second current electrode of the first transistor is less than 200 milliVolts (mV).

12. A circuit as in claim 8, wherein the combination of the control circuit and the comparison circuit forms a closed-loop control circuit to regulate the control voltage.

13. A circuit as in claim 8, wherein the DC-DC boost circuit generates a regulated voltage, and wherein the regulated voltage is provided as the constant voltage.

* * * * *